United States Patent
Skog et al.

(10) Patent No.: US 11,509,570 B2
(45) Date of Patent: Nov. 22, 2022

(54) RESOURCE USAGE IN A MULTIPATH NETWORK

(71) Applicant: Telefonaktiebolaget LM Ericsson (publ), Stockholm (SE)

(72) Inventors: Robert Skog, Hässelby (SE); Jimmy Bjorklund, Jarfalla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 108 days.

(21) Appl. No.: 16/301,006

(22) PCT Filed: May 13, 2016

(86) PCT No.: PCT/EP2016/060903
§ 371 (c)(1),
(2) Date: Nov. 13, 2018

(87) PCT Pub. No.: WO2017/194172
PCT Pub. Date: Nov. 16, 2017

(65) Prior Publication Data
US 2019/0182146 A1    Jun. 13, 2019

(51) Int. Cl.
*H04L 45/00* (2022.01)
*H04L 45/125* (2022.01)
(Continued)

(52) U.S. Cl.
CPC .............. *H04L 45/22* (2013.01); *H04L 43/16* (2013.01); *H04L 45/125* (2013.01); *H04L 45/24* (2013.01);
(Continued)

(58) Field of Classification Search
CPC ....... H04L 43/16; H04L 45/125; H04L 45/22; H04L 45/24; H04L 45/28; H04L 47/12; H04L 47/28; H04L 47/30; H04L 69/163
See application file for complete search history.

(56) References Cited

U.S. PATENT DOCUMENTS 6,778,531 B1 * 8/2004 Kodialam ............... H04L 12/18
                                                          370/256
7,110,774 B1 * 9/2006 Davis ....................... G01S 5/14
                                                          342/450
(Continued)

FOREIGN PATENT DOCUMENTS

| CN | 103327027 A | 9/2013 |
| EP | 2453614 A1 | 5/2012 |
| WO | WO 2009056172 A1 | 5/2009 |

OTHER PUBLICATIONS

Jeong et al., "CDMA/TDD System for Wireless Multimedia Services with Traffic Unbalance Between Uplink and Downlink", IEEE Journal on Selected Areas in Communications, vol. 17, No. 5, pp. 939-946. (Year: 1999).*

(Continued)

*Primary Examiner* — Schquita D Goodwin
*Assistant Examiner* — Jonathan A Sparks
(74) *Attorney, Agent, or Firm* — Sage Patent Group

(57) ABSTRACT

There is provided a first network node arranged to communicate with a second network node, the first and second network nodes being connected by a first path and a second path. The first path uses a first communications network and the second path uses a second communications network. The first network node has a first mode and a second mode of operation, such that in a first mode traffic between the first and second network nodes is transmitted over the first path and not the second path, and in a second mode traffic between the first and second network nodes is transmitted over the first path and the second path. The network node comprises a mode selector arranged to select the second mode of operation when the demanded amount of traffic between the first and second network nodes exceeds a threshold value for a period of time.

15 Claims, 6 Drawing Sheets

(51) Int. Cl.

| | |
|---|---|
| *H04L 45/24* | (2022.01) |
| *H04L 45/28* | (2022.01) |
| *H04L 43/16* | (2022.01) |
| *H04L 47/12* | (2022.01) |
| *H04L 47/28* | (2022.01) |
| *H04L 47/30* | (2022.01) |
| *H04L 69/163* | (2022.01) |

(52) U.S. Cl.
CPC ............. *H04L 45/28* (2013.01); *H04L 47/12* (2013.01); *H04L 47/28* (2013.01); *H04L 47/30* (2013.01); *H04L 69/163* (2013.01)

(56) References Cited

U.S. PATENT DOCUMENTS

| | | | |
|---|---|---|---|
| 8,289,844 B2 | 10/2012 | Abbas | |
| 2004/0042396 A1* | 3/2004 | Brown | H04L 45/00 370/227 |
| 2007/0070892 A1* | 3/2007 | Lee | H04L 69/165 370/237 |
| 2007/0153802 A1* | 7/2007 | Anke | H04L 67/12 370/395.42 |
| 2008/0310332 A1* | 12/2008 | Hansen | H04W 12/06 370/310 |
| 2009/0238074 A1 | 9/2009 | Vasseur et al. | |
| 2010/0061244 A1 | 3/2010 | Meier et al. | |
| 2010/0142366 A1* | 6/2010 | Bugenhagen | H04L 47/746 370/216 |
| 2011/0194405 A1* | 8/2011 | Abbas | H04L 45/14 370/221 |
| 2011/0216665 A1 | 9/2011 | Bali et al. | |
| 2013/0128738 A1 | 5/2013 | Cohen et al. | |
| 2013/0275578 A1* | 10/2013 | Williams | H04L 47/822 709/224 |
| 2013/0322255 A1* | 12/2013 | Dillon | H04L 43/0888 370/236 |
| 2014/0248051 A1* | 9/2014 | Gerstel | H04B 10/0793 398/38 |
| 2015/0205707 A1 | 7/2015 | Dwarakanath et al. | |
| 2015/0215225 A1 | 7/2015 | Mildh et al. | |
| 2016/0142933 A1* | 5/2016 | Rastogi | H04W 72/1247 370/230 |
| 2016/0192029 A1* | 6/2016 | Bergstrom | H04L 12/1886 709/219 |
| 2021/0067907 A1* | 3/2021 | Sze | H04L 12/5692 |

OTHER PUBLICATIONS

Boccardi et al., "Why to Decouple the Uplink and Downlink in Celllar NEtworks and How to Do It", IEEE Communications Magazine, Mar. 2016, pp. 110-117. (Year: 2016).*

International Search Report and Written Opinion of the International Searching Authority, PCT/EP2016/060903 dated Sep. 23, 2016, 11 pages.

European Communication of a Notice of Opposition for European Application No. 16722676, dated Jul. 7, 2020, 23 pages.

European Communication of a Notice of Opposition for European Application No. 16722676, dated Jul. 16, 2020, 1 pages.

Lim et al., "How Green is Multipath TCP for Mobile Devices?", SIGCOMM'14: ACM SIGCOMM 2014 Conference, Aug. 2014, Chicago, Illinois, USA. ISBN 978-1-4503-2990-3, https://doi.org/10.1145/2627585.2627596, pp. 3-8.

Tessares. Transcript of Internet Access Bonding DSL and 4G/LTE—powered by Tessares (MPTCP). YouTube [online] [video]. Sep. 9, 2015 [retrieved on Jul. 1, 2020]. Retrieved from https://youtu.be/7N_FEA63qX4, 2 pages.

Leymann et al. "GRE Tunnel Bonding. Internet Engineering Task Force" draft- zhang-gre-tunnel-bonding-02; May 6, 2016, 41 pages.

Ford, A et al. "TCP Extensions for Multipath Operation with Multiple Addresses." Internet Engineering Task Force. RFC 6824; Jan. 2013; ISSN: 2070-1721 721, 64 pages.

Lim et al. "Cross-layer path management in multi-path transport protocol for mobile devices." IEEE INFOCOM 2014—IEEE Conference on Computer Communications, Toronto, ON, 2014, pp. 1815-1823, <doi: 10.1109/INFOCOM.2014.6848120>, 9 pages.

First Office Action and Search Report dated Sep. 2, 2020 for Chinese Patent Application No. 201680087628.7, 10 pages.

ITU-D, "Question 12/2, Examine broadband communications over traditional copper wires: Report on DSL technologies; Study Group 2; 2nd study period (1998-2002)," https://handle.itu.int/11.1002/pub/800c81a2-en, 85 pages.

Leymann et al., "Hybrid Access Network Architecture," Network Working Group; Internet-Draft; draft-lhwxz-hybrid-accessnetwork-architecture-02, https://www.ietf.org/archive/id/draftlhwxz-hybrid-access-network-architecture-02.txt, Jan. 14, 2015; 17 pages.

\* cited by examiner

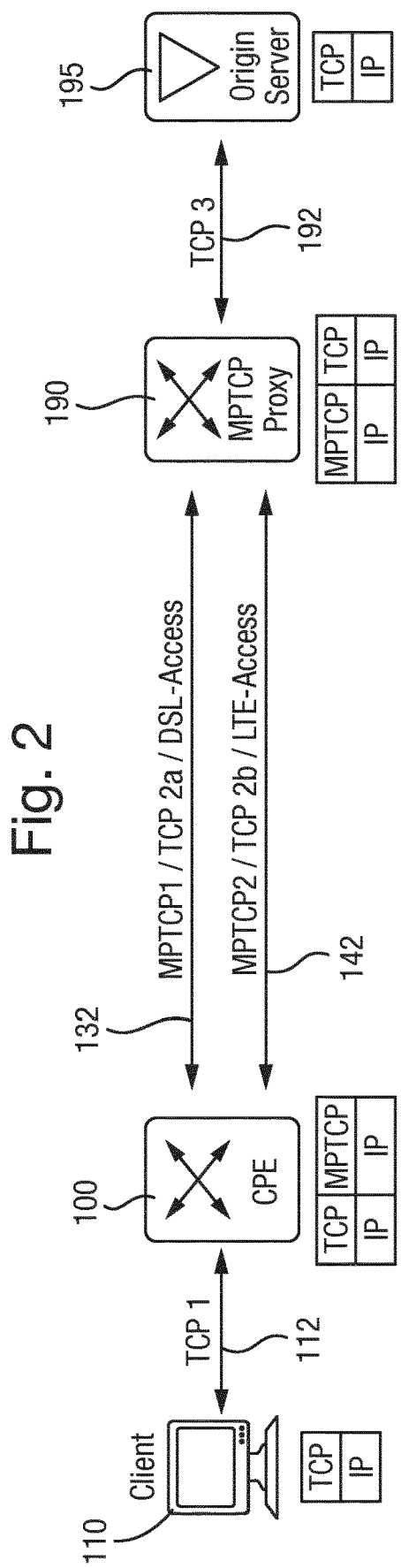

RESOURCE USAGE IN A MULTIPATH NETWORK

CROSS REFERENCE TO RELATED APPLICATIONS

This application is a 35 U.S.C. § 371 national stage application of PCT International Application No. PCT/EP2016/060903 filed on May 13, 2016, the disclosure and content of which is incorporated by reference herein in its entirety.

TECHNICAL FIELD

The present application relates to a first network node, a method in a first network node, a computer-readable medium, an apparatus to provide improved resource usage in a multipath network, a customer premises equipment, and a proxy.

BACKGROUND

Multipath connections use a plurality of paths to move traffic between two nodes of a network, via any number of intermediary nodes. Typically, a customer property comprises a high capacity local area network, which may be any combination of wired and wireless connections, such as Ethernet and WiFi. The local area network connects via a customer premises equipment (CPE) to a network gateway which in turn is connected to the internet backbone. The customer premises equipment is typically a combined wifi access point, router and modem. The physical connection between the customer premises equipment and the network gateway is often a bottleneck which limits the connection speed between a customer device and the internet.

The physical connection between the customer premises equipment and the network gateway may be provided by: a DSL connection, a full or partial optical fiber connection, or a connection via a wireless communications network. A DSL connection is a digital subscriber line whereby data is carried over telephone lines. Typically this is an asymmetric digital subscriber line (ADSL) the numerous types of which are not listed here. The optical fiber connection may comprise FTP/FTTH/FTTB (Fiber to the premises/home/building), or FTTC/N (fiber to the cabinet/node) with copper wires completing the connection to the premises/home/building. The wireless communication network may comprise a connection via a cellular network such as a 3G, LTE, or 5G network, or another form of wireless network such as a WiFi connection.

To address the problem of this bottleneck, prior art solutions have been proposed to combine more than one connection type between a customer premises equipment and the internet service provider. For example, traffic may be carried between a customer premises equipment and a proxy server by both a DSL connection and an LTE connection. This will allow the full bandwidth of both the DSL and the LTE connection to provide a link from the customer premises equipment to the internet, this multipath link having a higher capacity than a single connection.

An example of such a multipath connection arrangement is called Multipath TCP (MPTCP) as defined in IETF draft RFC 6824 (available from https://tools.ietf.org/html/rfc6824). This describes how extensions to regular TCP can enable connections across multiple paths simultaneously.

That both connections are available and can be used concurrently helps provide increased maximum bandwidth to a customer premises equipment. However, when a customer premises equipment requires less than this maximum bandwidth, the MPTCP nodes (the customer premises equipment and the MPTCP-Proxy) must each decide how best to split traffic between the two available connections.

Accordingly, there is defined herein a method and apparatus to provide improved resource usage in a multipath network.

The international patent application having publication number WO 2009/056172 A1, titled 'NETWORKS HAVING MULTIPLE PATHS BETWEEN NODES AND NODES FOR SUCH A NETWORK', and with applicant 'TELEFONAKTIEBOLAGET LM ERICSSON (PUBL)' describes a network comprising a first node and a second network node, the nodes being connected via a first path and a second path. The network has a first mode and a second mode of operation. In the first mode traffic between the first and second network nodes is transmitted over the first path and not the second path. In the second mode the traffic is transmitted using both the first and also the second paths. The network comprises a mode selector arranged to select the mode of operation based upon a demanded amount of traffic between the first and second network nodes.

SUMMARY

Accordingly, there is provided a first network node arranged to communicate with a second network node, the first and second network nodes being connected by a first path and a second path. The first path uses a first communications network and the second path uses a second communications network. The first network node has a first mode and a second mode of operation, such that in a first mode traffic between the first and second network nodes is transmitted over the first path and not the second path, and in a second mode traffic between the first and second network nodes is transmitted over the first path and the second path. The network node comprises a mode selector arranged to select the second mode of operation when the demanded amount of traffic between the first and second network nodes exceeds a threshold value for a period of time.

The selection of the second mode of operation may comprise a switch from the first mode of operation to the second mode of operation. The network node will not switch to the second mode and use the second path in combination with the first path unless the demanded amount of traffic between the first and second network nodes exceeds a threshold value for a period of time. The period of time is a time delay, and this time delay reduces the number of times that the second path is used to carry a small amount of data, which might happen when the bandwidth demand only briefly exceeds the capacity of the first link. This reduces the number of small packets carried by the second communications network, which results in a more efficient use of the network resources.

The demanded value of traffic may be determined as the rate of input traffic received by the first network node for transmission to the second network node, and the threshold value for the demanded amount of traffic may be determined as a percentage of the bandwidth available on the first path. That percentage may be less than, equal to, or greater than 100%. The bandwidth available on the first path may be periodically measured and the threshold value recalculated after a measurement is taken.

The demanded value of traffic may be determined as the send buffer capacity of the first network node, and the threshold value for the demanded amount of traffic may be determined as a percentage of the occupied buffer. That percentage may be less than, equal to, or greater than 100%.

The predetermined period of time is set by the operator of the first and second network nodes. The predetermined period of time may be 1 second.

The first network node may comprise a third mode of operation in which traffic between the first and second network nodes is sent only using the second path, and in which the mode selector is arranged to select this third mode should there be a fault on the first path.

The first path may comprise one of: a digital subscriber line, an optical fiber connection, a hybrid optical fiber copper wire connection, and a wireless connection. The second path may comprise one of: a digital subscriber line, an optical fiber connection, a hybrid optical fiber copper wire connection, and a wireless connection.

The first and second path may be of the same type, such as two DSL lines, or two LTE connections. One reason for such a solution to be implemented is if the cost of the first and second paths is different despite using the same technology. For example, the first path may be an unlimited flat-fee ADSL line, whereas the second path may also be an ADSL line but one that is charged for on the basis of a pay per gigabyte of data used.

The physical connection between the customer premises equipment and the network gateway may be provided by: a DSL connection, a full or partial optical fiber connection, or a connection via a wireless communication network. A DSL connection is a digital subscriber line whereby data is carried over telephone lines. Typically this is an asymmetric digital subscriber line (ADSL) the numerous types of which are not listed here. The optical fiber connection may comprise FTP/FTTH/FTTB (Fiber to the premises/home/building), or FTTC/N (fiber to the cabinet/node) with copper wires completing the connection to the premises/home/building. FTTC and FTTN are examples of hybrid optical fiber and copper wire connections. The wireless communication network may comprise a connection via a cellular network such as a 3G, LTE, 5G network, or another form of wireless network such as a WiFi connection.

There is further provided a method in a first network node, the first network node arranged to communicate with a second network node, the first and second network nodes being connected by a first path and a second path. The first path uses a first communications network and the second path uses a second communications network. The first network node has a first mode of operation and a second mode of operation, such that in a first mode traffic between the first and second network nodes is transmitted over the first path and not the second path, and in a second mode traffic between the first and second network nodes is transmitted over the first path and the second path. The first network node is arranged to:
  start a timer when the demanded amount of traffic between the first and second network nodes exceeds a threshold value; and
  select the second mode of operation if the demanded amount of traffic exceeds the threshold value for the duration of the timer.

If the demanded amount of traffic between the first and second network nodes does not exceed a threshold value, then the first mode of operation is selected. If the demanded amount of traffic drops below the threshold value before the timer expires, then the first mode of operation is selected. The network node will not switch to the second mode and use the second path in combination with the first path unless the demanded amount of traffic between the first and second network nodes exceeds a threshold value for a period of time. This reduces the number of small packets carried by the second communications network, which results in a more efficient use of the network resources.

The demanded value of traffic may be determined as the rate of input traffic received by the first network node for transmission to the second network node, and the threshold value for the demanded amount of traffic is determined to be a percentage of the bandwidth available on the first path. That percentage may be less than, equal to, or greater than 100%. The bandwidth available on the first path may be periodically measured and the threshold value recalculated after a measurement is taken.

The demanded value of traffic may be determined as the send buffer capacity of the first network node, and the threshold value for the demanded amount of traffic may then be determined to be a percentage of the occupied buffer. That percentage may be less than, equal to, or greater than 100%.

The predetermined period of time may be set by the operator of the first and second network nodes. The predetermined period of time may be 1 second.

The first network node may further comprise a third mode of operation in which traffic between the first and second network nodes is sent only using the second path.

The first network node may be arranged to detect a fault state on the first path, and in response to such a detection to select the third mode.

There is further provided a computer-readable medium, carrying instructions, which, when executed by computer logic, causes said computer logic to carry out any of the methods defined herein.

There is further provided a computer-readable storage medium, storing instructions, which, when executed by computer logic, causes said computer logic to carry out any of the methods defined herein. The computer program product may be in the form of a non-volatile memory or volatile memory, e.g. an EEPROM (Electrically Erasable Programmable Read-only Memory), a flash memory, a disk drive or a RAM (Random-access memory).

There is further provided an apparatus to provide improved resource usage in a multipath network, the multipath network comprising a first network node arranged to communicate with a second network node. The first and second network nodes are connected by a first path and a second path. The first path uses a first communications network and the second path uses a second communications network. The first network node has a first mode of operation and a second mode of operation, such that in a first mode traffic between the first and second network nodes is transmitted over the first path and not the second path, and in a second mode traffic between the first and second network nodes is transmitted over the first path and the second path. The apparatus comprises a processor and a memory, said memory containing instructions executable by said processor whereby said apparatus is operative to: start a timer when the demanded amount of traffic between the first and second network nodes exceeds a threshold value; and select the second mode of operation if the demanded amount of traffic exceeds the threshold value for the duration of the timer.

There is further provided a customer premises equipment comprising a processor and memory, said memory containing instructions executable by said processor whereby said user terminal is operative to: start a timer when the demanded amount of traffic between the first and second network nodes on a first path to a proxy exceeds a threshold value; and to select the second mode of operation if the demanded amount of traffic exceeds the threshold value for the duration of the timer, wherein the second mode comprises using both a first path and a second path to connect the customer premises equipment to the proxy.

There is further provided a customer premises equipment arranged to communicate with a proxy, the customer premises equipment and the proxy being connected by a first path and a second path, the first path using a first communications network and the second path using a second communications network. The customer premises equipment has a first mode and a second mode of operation, such that in a first mode traffic between the customer premises equipment and the proxy is transmitted over the first path and not the second path, and in a second mode traffic between the customer premises equipment and the proxy is transmitted over the first path and the second path. The customer premises equipment comprises a mode selector arranged to select the second mode of operation when the demanded amount of traffic between the customer premises equipment and the proxy exceeds a threshold value for a period of time.

There is further provided a proxy arranged to communicate with a customer premises equipment, the proxy and the customer premises equipment being connected by a first path and a second path, the first path using a first communications network and the second path using a second communications network. The proxy has a first mode and a second mode of operation, such that in a first mode traffic between the proxy and the customer premises equipment is transmitted over the first path and not the second path, and in a second mode traffic between the proxy and the customer premises equipment is transmitted over the first path and the second path. The proxy comprises a mode selector arranged to select the second mode of operation when the demanded amount of traffic between the proxy and the customer premises equipment exceeds a threshold value for a period of time.

BRIEF DESCRIPTION OF THE DRAWINGS

A method and apparatus to provide improved usage of a wireless communications network in a multipath network will now be described, by way of example only, with reference to the accompanying drawings, in which:

FIG. 2 shows how an MPTCP connection between a first node and a second node is established;

DETAILED DESCRIPTION

In this detailed description, numerous specific details are set forth in order to provide a thorough understanding of the embodiments of the invention. It will be understood by those skilled in the art, however, that the embodiments of the invention may be practiced without these specific details. In other instances, well known methods, procedures, components and circuits have not been described in detail so as not to obscure the embodiments of the invention. It can be appreciated that the specific structural and functional details disclosed herein may be representative and do not necessarily limit the scope of the invention.

An embodiment of the invention may include functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor.

Alternatively, an embodiment of the invention may be implemented as specific hardware components that contain hard-wired logic for performing the recited functionality, or by any combination of programmed general-purpose computer components and custom hardware components.

Figure 1:
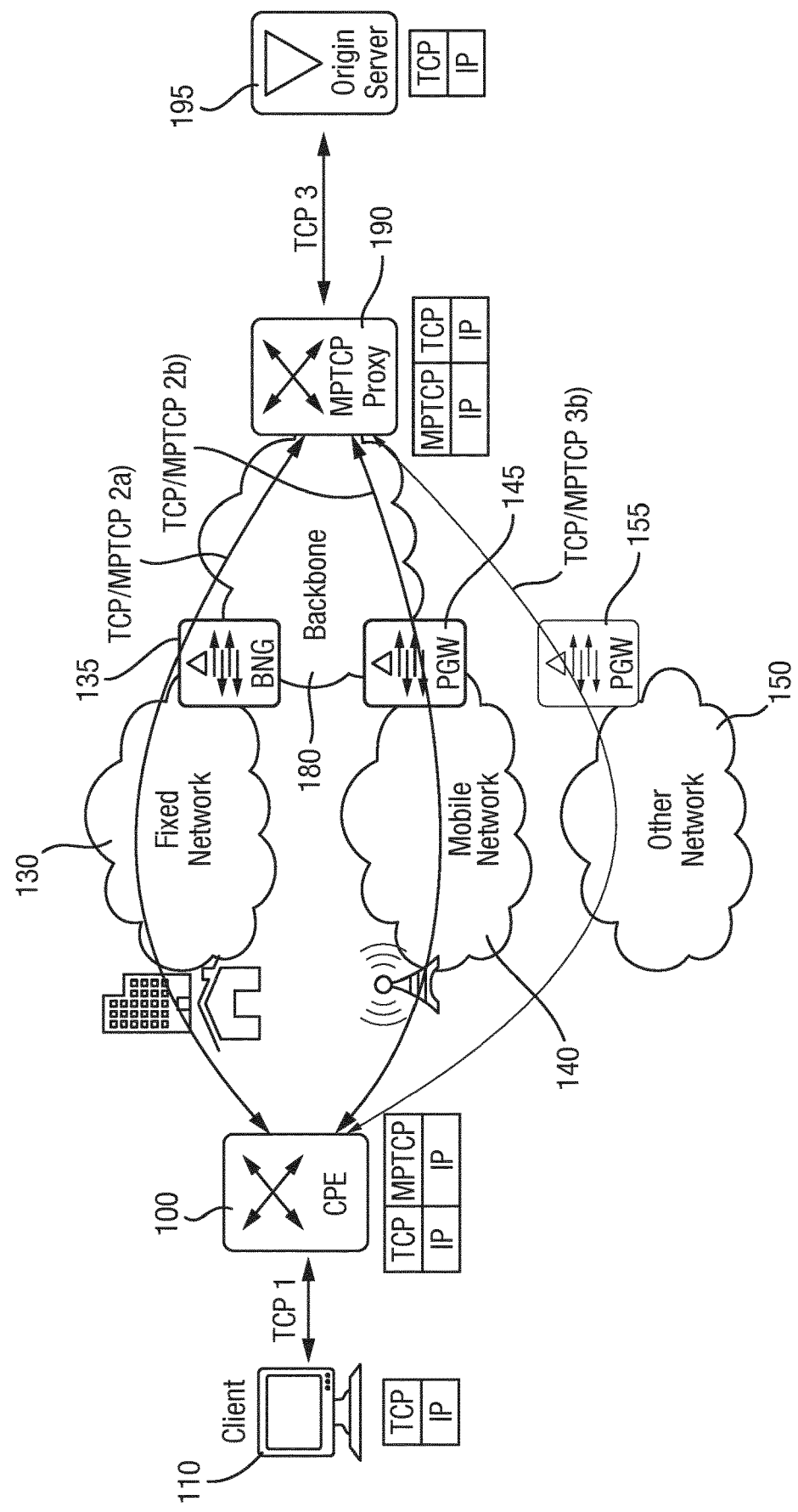
FIG. 1 shows an overview of a multipath system.

Referring now in detail to the drawings there is illustrated in FIG. 1, a client device 110 which connects via a local area network to customer premises equipment 100. This connection is labelled TCP 1. The customer premises equipment 100 has two possible connections to the internet backbone 180, each via a respective network gateway. A first connection TCP/MPTCP 2a is provided by a fixed network 130 and a broadband network gateway 135. The second connection TCP/MPTCP 2b is provided by a wireless communications network 140 and a packet data network gateway 145. Optionally, a further connection may be provided another network 150 with a respective network gateway 155.

Traffic from the first and second connections makes its way to the MPTCP-Proxy 190 over the internet backbone 180. At the MPTCP-Proxy 190 the separate traffic flows TCP/MPTCP 2a and TCP/MPTCP 2b are combined to form a single traffic flow, labelled TCP 3, which is sent to the origin server 195. In this way TCP traffic is carried between the client device 110 and the origin server 195 using both the fixed network 130 and the wireless communications network 140, with neither end point requiring modification to use the multipath protocol. It should be noted that in the reverse direction the MPTCP-proxy 190 splits TCP traffic into two connections which are carried by the fixed network 130 and the wireless communications network 140 and then combined at the customer premises equipment 100.

How the MPTCP connection is setup will be described with reference to FIG. 2. When an application in the client device 110 identifies it needs to start a TCP connection to the Origin Server, it sends a TCP set-up (TCP SYN/ACK etc.) to the customer premises equipment (CPE) 100. Upon receipt of this connection CPE 100 will initiate a new TCP-connection by sending a TCP SYN to the Origin Server 195 and including TCP MPTCP-options to that TCP SYN. The TCP SYN will travel via the MPTCP-Proxy 190. The MPTCP-Proxy 190 will answer back that it supports MPTCP and then initiate a new TCP-connection to the Origin Server 195. This first MPTCP-connection between the CPE 100 and the MPTCP-Proxy 190 is denoted MP_Capable.

After the MP_Capable is set-up, and when the CPE 100 determines that more bandwidth is required, the CPE 100 will add a new path, i.e. a new TCP-connection 142 between the CPE 100 and the MPTCP-Proxy 190. This second MPTCP-connection 142 is denoted MP-Join. The CPE 100 and the MPTCP-Proxy 190 are MPTCP aware nodes and may be referred to herein as MPTCP nodes.

The CPE 100 then has a choice of connection (132, 142) to send traffic to the MPTCP-Proxy 190. Similarly, on the downlink path, the MPTCP-Proxy 190 has a choice of connection (132, 142) to send traffic to the CPE 100. A traffic steering algorithm determines which of the two connections to use. Typically, a fixed access network provides a core service, and the wireless communications network provides additional bandwidth when high speeds are required. This is because bandwidth requirements of the customer premises equipment 100 vary, and sometimes the fixed access connection 135 alone will provide sufficient bandwidth to meet the demands of clients 110 in the local area network connected to the customer premises equipment 100.

A common traffic steering use case in MPTCP is to send as much traffic as possible on the "cheapest link", here via the DSL network 130 and when DSL is full send surplus traffic on LTE network 140.

However, there is a problem with steering traffic in such a way. An LTE connection has a significant overhead, such that sending a small amount of data over an LTE network 140 is an inefficient use of network resources. Indeed, any network has a signaling overhead and even where a non-LTE network provides the secondary network path, sending a small amount of data will be an inefficient use of that network. A more efficient use of network resources can be achieved if an MPTCP node is restricted from sending traffic over the secondary network connection in certain circumstances.

For example, in a preferred embodiment, an MPTCP node will only divert traffic to a second connection path if the bandwidth demands exceed the capacity of a first connection path for a particular period of time, such as 1 second. A node arranged to operate in this way will open fewer connections using the secondary communication network. Given the inherent signaling overhead in establishing the secondary communication channel, such a node will make more efficient use of network resources. The period of time can be called a time delay, which delays usage of the second path after a bandwidth condition is met on the first path. The time delay might be set to 1 second, but in practice would likely be varied according to system requirements. For example, an administrator at the customer premises may select a value of the time delay depending on the cost of using the second path. Alternatively, the owner of the MPTCP-Proxy may select the value of the time delay; for example, to balance congestion between a first and second communications network, or to optimize the use of one of these networks where the networks use different technologies and have different characteristics such as signaling overhead.

It should be noted that the bandwidth threshold criterion might be set as the bandwidth demand exceeding a bandwidth threshold value. The bandwidth threshold value may be the capacity of the first path, but in practice this too would likely be varied according to system requirements. For example, an administrator at the customer premises may select a value of the bandwidth threshold depending on the cost of using the second path. Alternatively, the owner of the MPTCP-Proxy may select the value of the bandwidth threshold; for example, to balance congestion between a first and second communications network, or to optimize the use of one of these networks where the networks use different technologies and have different characteristics.

There are numerous ways to determine the bandwidth threshold criteria that trigger the start of the time delay before the second path is used. The bandwidth demand may be measured as the traffic throughput of the link. Alternatively, the bandwidth demand may be measured as the fill level of the nodes output buffer.

Where the bandwidth demand is measured as the traffic throughput of the link, the bandwidth threshold may be defined as the capacity of the first path. That capacity may be the expected throughput bandwidth of the first path. The threshold could be some proportion of that capacity; it could even be a measure of demand for bandwidth exceeding the capacity of the first path by a certain proportion.

Where the bandwidth demand is measured as the fill level of the output buffer, the bandwidth threshold criteria may be that the send buffer of the first path is more than 80% full, or greater than some other value or proportion of the total send buffer capacity.

The time delay and the bandwidth threshold criteria may be the same in both the uplink direction, as determined by the customer premises equipment, and the downlink direction, as determined by the MPTCP-Proxy. Alternatively, different criteria may be set for the uplink and downlink traffic.

Figure 3A:
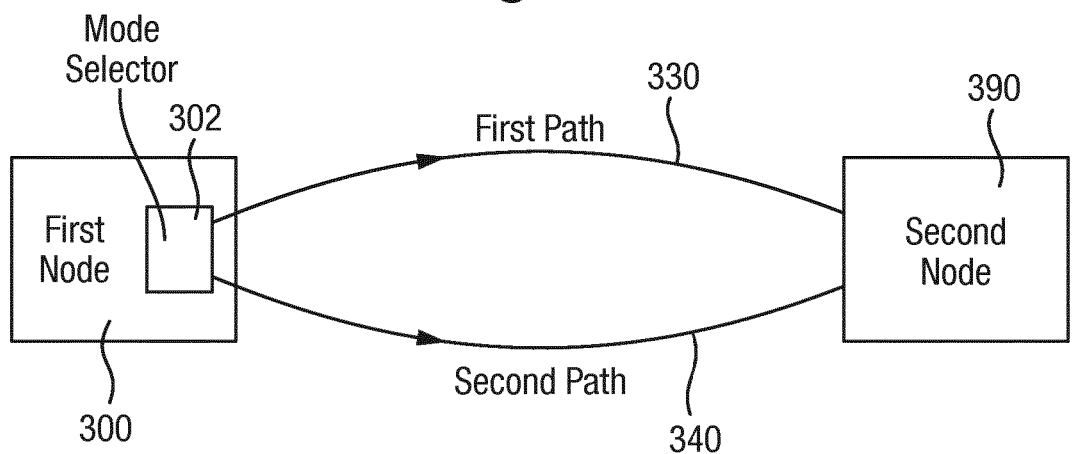
FIGS. 3a and 3b illustrate a first network node and a second network node connected by a first path and a second path.
Figure 3B:
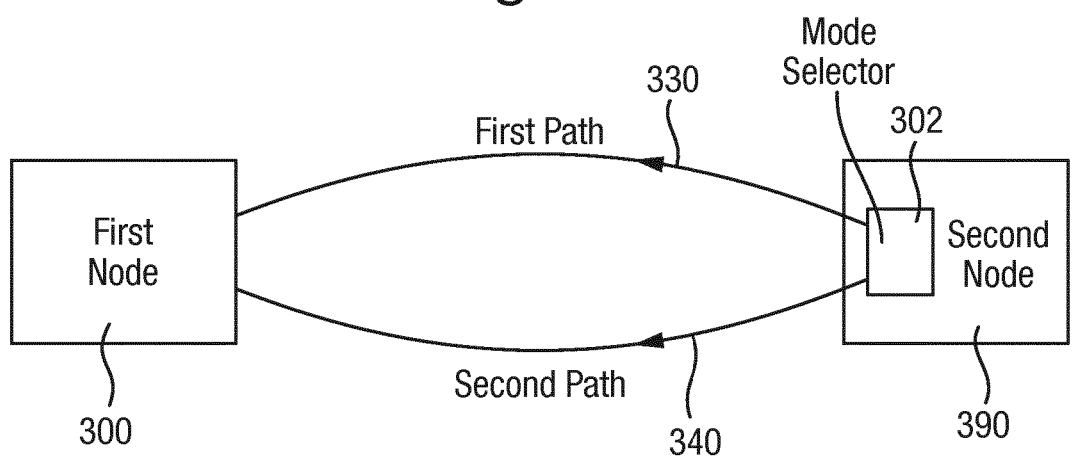

FIGS. 3a and 3b illustrate a first network node and a second network node connected by a first path and a second path. For clarity, FIG. 3a illustrates uplink communication and FIG. 3b illustrates downlink communication.

FIG. 3a illustrates a first network node 300 sending data traffic to a second network node 390. The first network node 300 and second network node 390 are connected by a first path 330 and a second path 340. The first path 330 uses a first communications network and the second path 340 uses a second communications network. The first network node 300 has a first mode and a second mode of operation, such that in a first mode traffic between the first network node 300 and second network node 390 is transmitted over the first path 330 and not the second path 340, and in a second mode traffic between the first network node 300 and second network node 390 is transmitted over the first path 330 and the second path 340. The first network node 300 comprises a mode selector 302 arranged to select the second mode of operation when the demanded amount of traffic between first network node 300 and second network node 390 exceeds a threshold value for a period of time.

FIG. 3b illustrates a second network node 390 sending data traffic to a first network node 300. The second network node 390 and first network node 300 are connected by a first path 330 and a second path 340. The first path 330 uses a first communications network and the second path 340 uses a second communications network. The second network node 390 has a first mode and a second mode of operation, such that in a first mode traffic between the second network node 390 and first network node 300 is transmitted over the first path 330 and not the second path 340, and in a second mode traffic between the second network node 390 and first network node 300 is transmitted over the first path 330 and the second path 340. The second network node 390 comprises a mode selector 392 arranged to select the second mode of operation when the demanded amount of traffic between second network node 390 and first network node 300 exceeds a threshold value for a period of time. The selection of the second mode of operation results in a switch from the first mode of operation to the second mode of operation.

Either network node will not switch to the second mode and use the second path in combination with the first path unless the demanded amount of traffic between the two network nodes exceeds a threshold value for a period of time. The period of time is a time delay, and this time delay reduces the number of times that the second path is used to carry a small amount of data, which might happen when the bandwidth demand only briefly exceeds the capacity of the first link. This reduces the number of connections opened on the second communications network to handle only a small amount of data. Because of the signaling overhead required to open a connection on the second communications network, this reduction results in a more efficient use of the network resources.

The demanded value of traffic may be determined as the rate of input traffic received by the sending network node for transmission to the receiving network node, and the threshold value for the demanded amount of traffic may be determined as a percentage of the bandwidth available on the first path 330. That percentage may be less than, equal to, or greater than 100%. The bandwidth available on the first path 330 may be periodically measured and the threshold value recalculated after a measurement is taken.

The demanded value of traffic may be determined as the send buffer capacity of the sending network node, and the threshold value for the demanded amount of traffic may be determined as a percentage of the occupied buffer. That percentage may be less than, equal to, or greater than 100%.

The predetermined period of time is set by the operator of the first and second network nodes 300, 390. The predetermined period of time may be 1 second.

The sending network node may comprise a third mode of operation in which traffic between the two network nodes is sent only using the second path 340, and in which the mode selector 302, 392 is arranged to select this third mode should there be a fault on the first path 330.

The first path 330 may comprise one of: a digital subscriber line, an optical fiber connection, a hybrid optical fiber copper wire connection, and a wireless connection. The second path 340 may comprise one of: a digital subscriber line, an optical fiber connection, a hybrid optical fiber copper wire connection, and a wireless connection.

The first and second paths 330, 340 may be of the same type, such as two DSL lines, or two LTE connections. One reason for such a solution to be implemented is if the cost of the first and second paths is different despite using the same technology. For example, the first path may be an unlimited flat-fee ADSL line, whereas the second path may also be an ADSL line but one that is charged for on the basis of a pay per gigabyte of data used.

The physical connection between the customer premises equipment and the network gateway may be provided by: a DSL connection, a full or partial optical fiber connection, or a connection via a wireless communication network. A DSL connection is a digital subscriber line whereby data is carried over telephone lines. Typically this is an asymmetric digital subscriber line (ADSL) the numerous types of which are not listed here. The optical fiber connection may comprise FTP/FTTH/FTTB (Fiber to the premises/home/building), or FTTC/N (fiber to the cabinet/node) with copper wires completing the connection to the premises/home/building. FTTC and FTTN are examples of hybrid optical fiber and copper wire connections. The wireless communication network may comprise a connection via a cellular network such as a 3G, LTE, 5G network, or another form of wireless network such as a WiFi connection.

Figure 4:
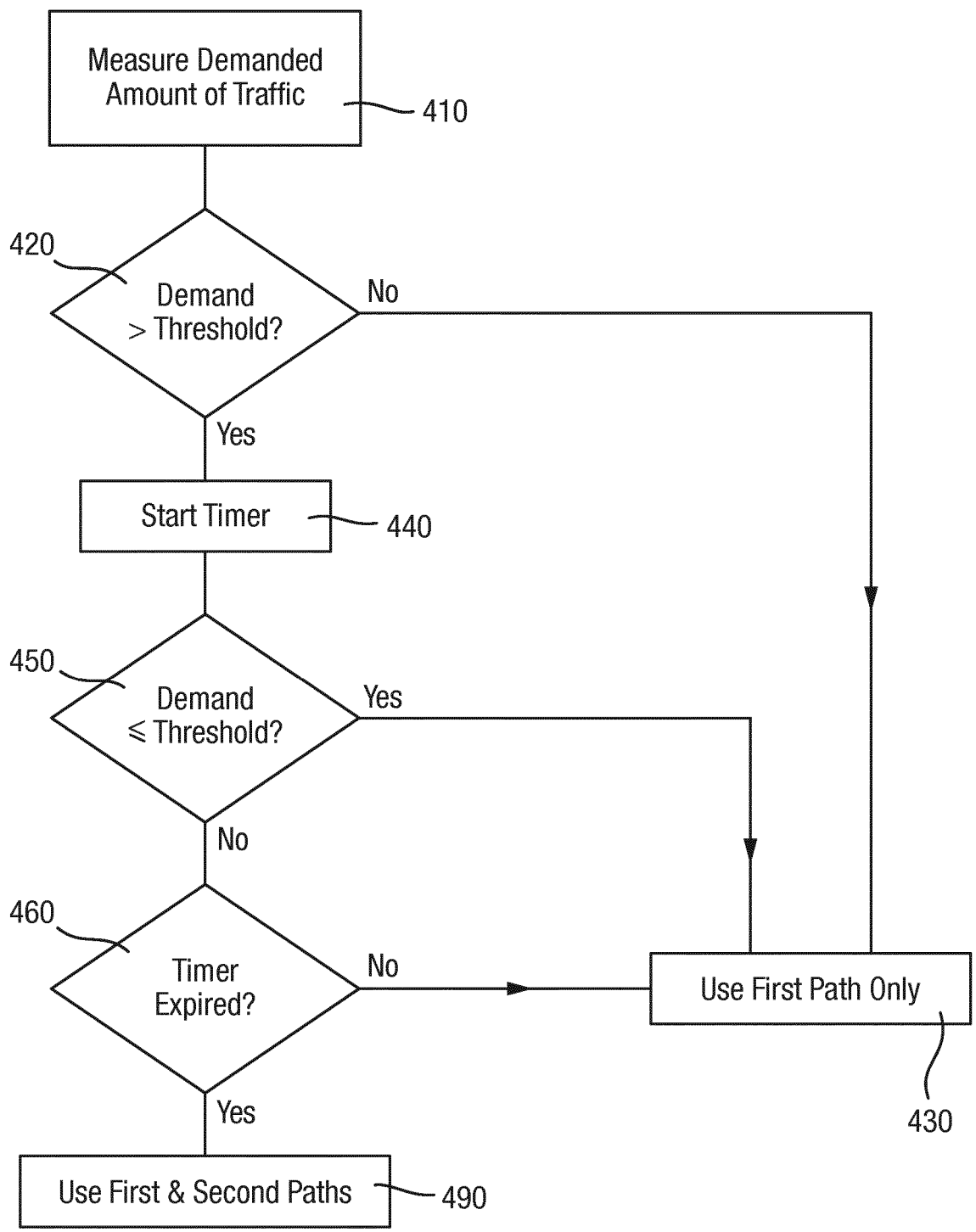
FIG. 4 illustrates a method in a first network node.

FIG. 4 illustrates a method in a first network node, the first network node arranged to communicate with a second network node, the first and second network nodes being connected by a first path and a second path. The first path uses a first communications network and the second path uses a second communications network. The first network node has a first mode of operation and a second mode of operation, such that in a first mode traffic between the first and second network nodes is transmitted over the first path and not the second path, and in a second mode traffic between the first and second network nodes is transmitted over the first path and the second path.

The first network node is arranged to measure 410 the demanded amount of traffic to be sent from the first network node to the second network node. The first network node is further arranged to determine 420 if that demanded amount of traffic exceeds a threshold value. If it does not exceed the threshold the first network node uses 430 only the first path.

If the first network node determines 420 that the demanded amount of traffic does exceed the threshold value, it starts a timer 440. During the countdown of the timer 440 the first network node monitors the demanded amount of traffic to be sent from the first network node to the second network node and determines 450 if that demand drops back below the threshold value. If it does, then the first network node uses 430 only the first path.

If the first network node determines 460 that the timer has expired and determines 450 that the demanded amount of traffic has not dropped below the threshold value during that time, the first network nodes uses 490 both the first and second paths. The use 490 of both network paths may comprise setting up a connection over the second communications network to create the second path.

The method illustrated in FIG. 4 is explained above in the context of a first network node communicating with a second network node in, say, an uplink direction. The same method may be performed in the second network node in the downlink direction. The thresholds, timer values, and even the way of measuring bandwidth demand do not need to be the same in the uplink and downlink directions between any two nodes.

If the demanded amount of traffic between the first and second network nodes does not exceed a threshold value, then the first mode of operation is selected. If the demanded amount of traffic drops below the threshold value before the timer expires, then the first mode of operation is selected. The network node will not switch to the second mode and use the second path in combination with the first path unless the demanded amount of traffic between the first and second network nodes exceeds a threshold value for a period of time. This reduces the number of small packets carried by the second communications network, which results in a more efficient use of the network resources.

The demanded value of traffic may be determined as the rate of input traffic received by the first network node for transmission to the second network node, and the threshold value for the demanded amount of traffic is determined to be a percentage of the bandwidth available on the first path. That percentage may be less than, equal to, or greater than 100%. The bandwidth available on the first path may be periodically measured and the threshold value recalculated after a measurement is taken.

The demanded value of traffic may be determined as the send buffer capacity of the first network node, and the threshold value for the demanded amount of traffic may then be determined to be a percentage of the occupied buffer. That percentage may be less than, equal to, or greater than 100%.

The predetermined period of time may be set by the operator of the first and second network nodes. The predetermined period of time may be 1 second.

Figure 5:
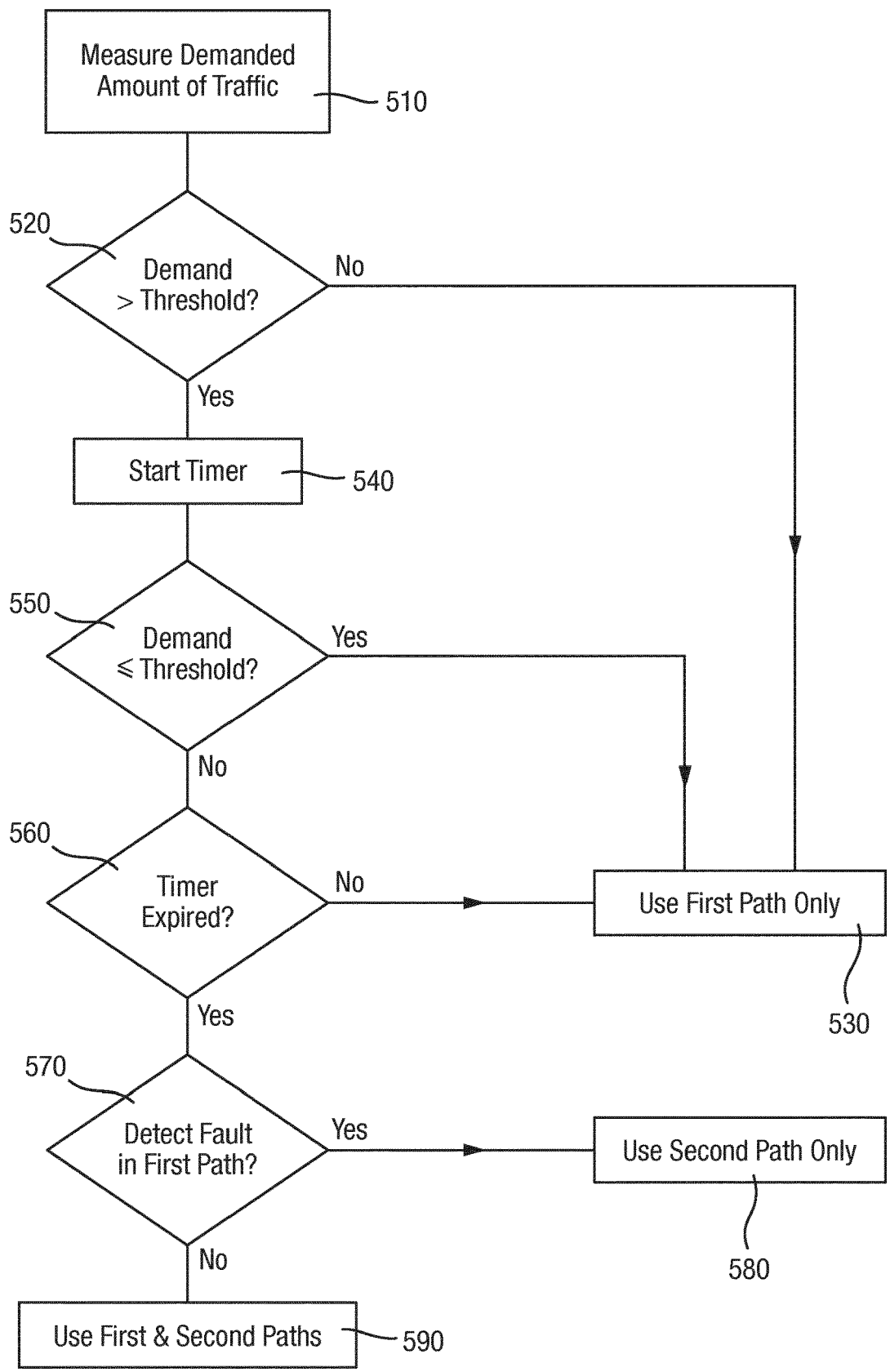
FIG. 5 illustrates an alternative method in a first network node.

FIG. 5 illustrates an alternative method in a first network node, the first network node arranged to communicate with a second network node, the first and second network nodes being connected by a first path and a second path. The first path uses a first communications network and the second path uses a second communications network. The first network node has a first mode of operation and a second mode of operation, such that in a first mode traffic between the first and second network nodes is transmitted over the first path and not the second path, and in a second mode traffic between the first and second network nodes is transmitted over the first path and the second path.

The first network node is arranged to measure 510 the demanded amount of traffic to be sent from the first network node to the second network node. The first network node is further arranged to determine 520 if that demanded amount of traffic exceeds a threshold value. If it does not exceed the threshold the first network node uses 530 only the first path.

If the first network node determines 520 that the demanded amount of traffic does exceed the threshold value, it starts a timer 540. During the countdown of the timer 540 the first network node monitors the demanded amount of traffic to be sent from the first network node to the second network node and determines 550 if that demand drops back below the threshold value. If it does, then the first network node uses 530 only the first path.

The first network node also comprises a fault detection routine; if a fault is detected 570 in the first path, the first network node uses the second path only 580.

If the first network node determines 560 that the timer has expired and determines 550 that the demanded amount of traffic has not dropped below the threshold value during that time, and determines 570 that there is no fault in the first path, then the first network node uses 590 both the first and second paths. The use 590 of both network paths may comprise setting up a connection over the second communications network to create the second path.

The method illustrated in FIG. 5 is explained above in the context of a first network node communicating with a second network node in, say, an uplink direction. The same method may be performed in the second network node in the downlink direction. The thresholds, timer values, and even the way of measuring bandwidth demand do not need to be the same in the uplink and downlink directions between the first and second network nodes.

The first path may comprise one of: a digital subscriber line, an optical fiber connection, a hybrid optical fiber copper wire connection, and a wireless connection; and wherein the second path comprises one of: a digital subscriber line, an optical fiber connection, a hybrid optical fiber copper wire connection, and a wireless connection.

The first and second path may be of the same type, such as two DSL lines, or two LTE connections. One reason for such a solution to be implemented is if the cost of the first and second paths is different despite using the same technology. For example, the first path may be an unlimited flat-fee ADSL line, whereas the second path may also be an ADSL line but one that is charged for on the basis of a pay per gigabyte of data used.

The physical connection between the customer premises equipment and the network gateway may be provided by: a DSL connection, a full or partial optical fiber connection, or a connection via a wireless communication network. A DSL connection is a digital subscriber line whereby data is carried over telephone lines. Typically this is an asymmetric digital subscriber line (ADSL) the numerous types of which are not listed here. The optical fiber connection may comprise FTP/FTTH/FTTB (Fiber to the premises/home/building), or FTTC/N (fiber to the cabinet/node) with copper wires completing the connection to the premises/home/building. FTTC and FTTN are examples of hybrid optical fiber and copper wire connections. The wireless communication network may comprise a connection via a cellular network such as a 3G, LTE, or 5G network, or another form of wireless network such as a WiFi connection.

There is further provided a computer-readable medium, carrying instructions, which, when executed by computer logic, causes said computer logic to carry out any of the methods defined herein.

There is further provided a computer-readable storage medium, storing instructions, which, when executed by computer logic, causes said computer logic to carry out any of the methods defined herein. The computer program product may be in the form of a non-volatile memory or volatile memory, e.g. an EEPROM (Electrically Erasable Programmable Read-only Memory), a flash memory, a disk drive or a RAM (Random-access memory).

There is further provided an apparatus to provide improved resource usage in a multipath network, the multipath network comprising a first network node arranged to communicate with a second network node. The first and second network nodes are connected by a first path and a second path. The first path uses a first communications network and the second path uses a second communications network. The first network node has a first mode of operation and a second mode of operation, such that in a first mode traffic between the first and second network nodes is transmitted over the first path and not the second path, and in a second mode traffic between the first and second network nodes is transmitted over the first path and the second path. The apparatus comprises a processor and a memory, said memory containing instructions executable by said processor whereby said apparatus is operative to: start a timer when the demanded amount of traffic between the first and second network nodes exceeds a threshold value; and select the second mode of operation if the demanded amount of traffic exceeds the threshold value for the duration of the timer.

Figure 6:
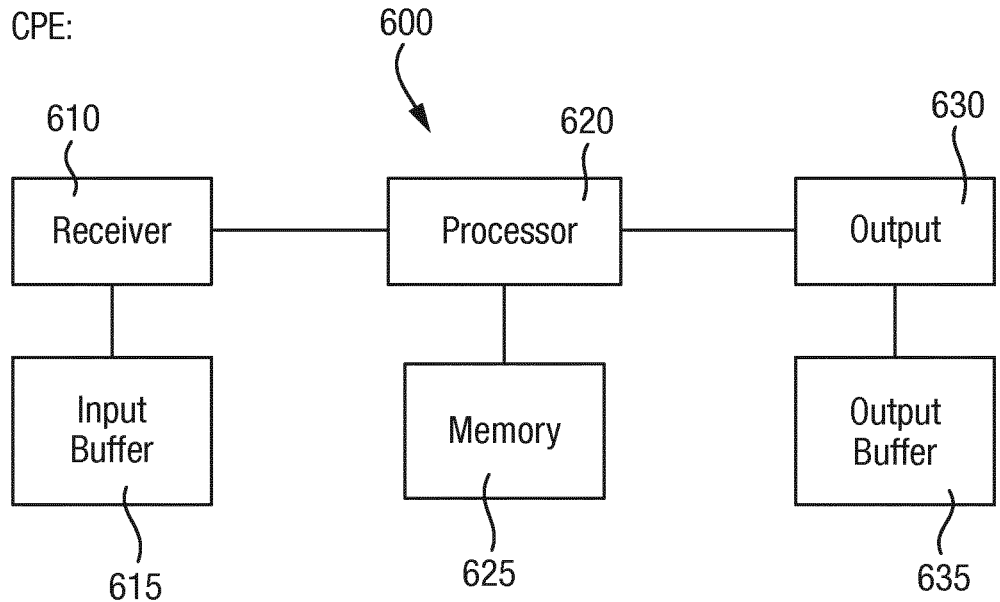
FIG. 6 illustrates a customer premises equipment.

FIG. 6 illustrates a customer premises equipment 600 comprising a processor 620 connected to a memory 625, a receiver 610, and an output 630. The receiver 610 has an input buffer 615 connected thereto and the output 630 has an output buffer 635 connected thereto. The processor 620 is arranged to receive instructions which, when executed, causes the processor 620 to carry out the above described method. The instructions may be stored on the memory 625. The memory 625, input buffer 615 and the output buffer 635 may comprise portions of a single physical memory. Buffers 615 and 635 are used to store data as it is retrieved from the receiver 610 or just before it is sent to via the output 630 respectively. The buffers are required to accommodate the difference between the rate at which data is received and the rate at which it can be processed, or in the case that these rates are variable, for example in a bursty packet transmission over an LTE network.

The demanded value of traffic may be determined according to how full the output buffer 635 is. The threshold value for the demanded amount of traffic may then be determined as a particular percentage occupancy of the output buffer 635. That percentage may be less than, equal to, or greater than 100%.

There is further provided a customer premises equipment comprising a processor and memory, said memory containing instructions executable by said processor whereby said user terminal is operative to: start a timer when the demanded amount of traffic between the first and second network nodes on a first path to a proxy exceeds a threshold value; and to select the second mode of operation if the demanded amount of traffic exceeds the threshold value for the duration of the timer, wherein the second mode comprises using both a first path and a second path to connect the customer premises equipment to the proxy.

There is further provided a customer premises equipment arranged to communicate with a proxy, the customer premises equipment and the proxy being connected by a first path and a second path, the first path using a first communications network and the second path using a second communications network. The customer premises equipment has a first mode and a second mode of operation, such that in a first mode traffic between the customer premises equipment and the proxy is transmitted over the first path and not the second path, and in a second mode traffic between the customer premises equipment and the proxy is transmitted over the first path and the second path. The customer premises equipment comprises a mode selector arranged to select the second mode of operation when the demanded amount of traffic between the customer premises equipment and the proxy exceeds a threshold value for a period of time.

Figure 7:
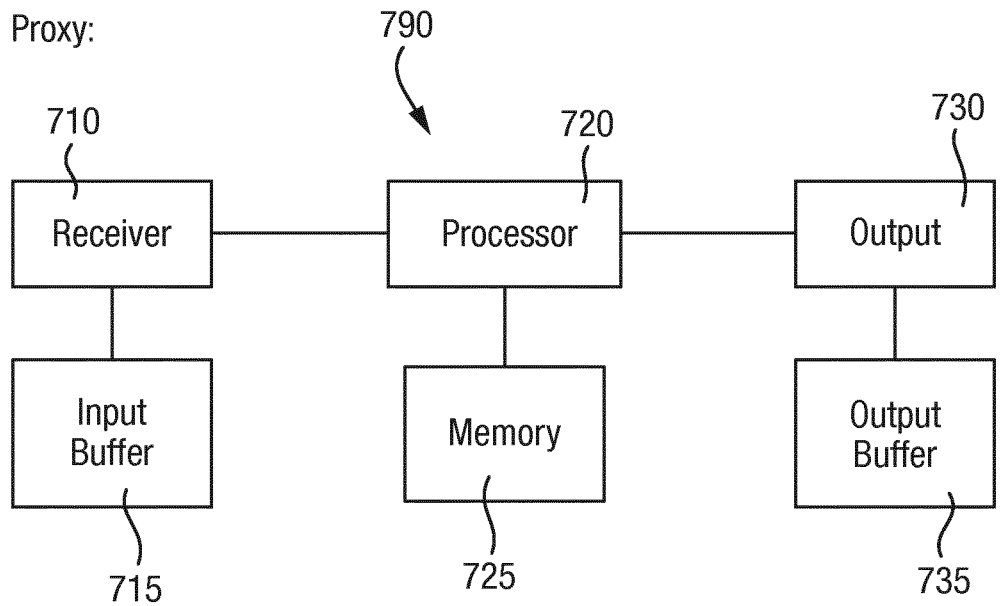
FIG. 7 illustrates a proxy.

FIG. 7 illustrates a proxy 790 comprising a processor 720 connected to a memory 725, a receiver 710, and an output 730. The receiver 710 has an input buffer 715 connected thereto and the output 730 has an output buffer 735 connected thereto. The processor 720 is arranged to receive instructions which, when executed, causes the processor 720 to carry out the above described method. The instructions may be stored on the memory 725. The memory 725, input buffer 715 and the output buffer 735 may comprise portions of a single physical memory. Buffers 715 and 735 are used to store data as it is retrieved from the receiver 710 or just before it is sent to via the output 730 respectively. The buffers are required to accommodate the difference between the rate at which data is received and the rate at which it can be processed, or in the case that these rates are variable, for example in a bursty packet transmission over an LTE network.

The demanded value of traffic may be determined according to how full the output buffer 735 is. The threshold value for the demanded amount of traffic may then be determined as a particular percentage occupancy of the output buffer 735. That percentage may be less than, equal to, or greater than 100%.

There is further provided a proxy arranged to communicate with a customer premises equipment, the proxy and the customer premises equipment being connected by a first path and a second path, the first path using a first communications network and the second path using a second communications network. The proxy has a first mode and a second mode of operation, such that in a first mode traffic between the proxy and the customer premises equipment is transmitted over the first path and not the second path, and in a second mode traffic between the proxy and the customer premises equipment is transmitted over the first path and the second path. The proxy comprises a mode selector arranged to select the second mode of operation when the demanded amount of traffic between the proxy and the customer premises equipment exceeds a threshold value for a period of time.

In a specific example, consider downlink traffic over a DSL link having a maximum capacity of 4 Mbit/s. If the downlink traffic rate reaches 6 Mbit/s then 4 Mbit/s will be sent on DSL and 2 Mbit/s on an LTE link. This is a typical use case of multipath access 'send first on DSL, then on LTE'.

If the downlink traffic reaches 6 Mbit/s for only a very short time period then it is possible to let DSL handle that traffic instead of sending it immediately via the LTE link. The DSL link will only carry 4 Mbit/s but the output buffer of the MPTCP proxy will buffer the rest of the packets and deliver them later over the DSL link when it has free capacity. This does mean that the end-to-end RTT will go up for short period of time.

The above switching can be achieved using the following method, for a TCP connection from the MPTCP-proxy to a customer premises equipment.

When downlink traffic starts coming to MPTCP-Proxy, start sending those packets on DSL Measure maximum capacity for the DSL-link, i.e. how many Mbit/s that can be sent without saturating the DSL-link (saturation would be achieved when the buffer on the DSL TCP sending window is full).

Check input rate from internet, if it is greater than the measured maximum capacity for DSL-link, then Start an "exceed DSL capacity" timer IF the timer is less than 'threshold ms' THEN buffer the packets at MPTCP and send traffic to DSL when free capacity is available (when the DLS TCP sending window allows it)

IF 'timer' is more than 'threshold ms' THEN send surplus traffic on LTE link.

Continue to send surplus traffic on LTE

An alternative solution is to measure the MPTCP send buffer level at the proxy. If this buffer level is constantly increasing above value x for n repeated sends. The sends are sent at regular intervals and so counting sends is a surrogate measure of elapsed time; counting n sends is equivalent to measuring 'threshold ms'. Then the proxy input stream (from the origin server on the internet) has a higher throughput then the proxy output (here the DSL link to the CPE) and we can assume that we should create a secondary path (on LTE). Additionally, if the send buffer level reaches its max capacity or close to it (in one read) we should directly establish a secondary sub flow. This is an example of where two thresholds may be used: a first threshold which causes a timer to activate whereby if the bandwidth demand persists for the duration of the timer then the second link is opened, and a second threshold, greater than the first threshold, whereby if the bandwidth demand exceeds that then the second link is opened immediately. This restricts opening of the second link for border-line cases, but allows the second link to be opened immediately for extreme excursions of traffic. This might be necessary where the downlink demand spikes to a level that would saturate both the first and second links.

A similar process can be applied in the switch from the second mode of operation where both first and second paths are used back to the first mode of operation where the first path is used. This helps to prevent the second path being closed prematurely due to a temporary drop in bandwidth demand.

Accordingly, there is provided a first network node arranged to communicate with a second network node, the first and second network nodes being connected by a first path and a second path, the first path using a first communications network and the second path using a second communications network, and whereby the first network node has a first mode and a second mode of operation, such that in a first mode traffic between the first and second network nodes is transmitted over the first path and not the second path, and in a second mode traffic between the first and second network nodes is transmitted over the first path and the second path, wherein the network node comprises a mode selector arranged to switch from the second mode of operation to the first mode of operation when the demanded amount of traffic between the first and second network nodes drops below a threshold value for a period of time.

The network node will not switch to the first mode and use only the first path without the second path unless the demanded amount of traffic between the first and second network nodes drops below a threshold value for a period of time. This means that a temporary drop in bandwidth does not result in the second path being closed prematurely and having to be reopened again. The benefit of this is that the closing and reopening of the second path requires signaling overhead; if avoided this results in more efficient use of the network resources.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope The client device may be a user apparatus. The client device may be any kind of personal computer such as a television, a smart television, a set-top box, a games-console, a home-theatre personal computer, a tablet, a smartphone, a laptop, or even a desktop PC.

The above described method may be carried out by suitably adapted hardware, such as an adapted form of the exemplary hardware implementation of a customer premises equipment 100 or a MPTCP proxy 190 as shown in FIG. 1, where the adaptation involves providing additional functions or operations within the node, such as incorporating an ADSL modem in the CPE 100.

The method may also be embodied in a set of instructions, stored on a computer readable medium, which when loaded into a computer processor, Digital Signal Processor (DSP) or similar, causes the processor to carry out the hereinbefore described method of providing improved usage of a wireless communications network in a multipath network.

Equally, the method may be embodied as a specially programmed, or hardware designed, integrated circuit which operates to carry out the method on video data loaded into the said integrated circuit. The integrated circuit may be formed as part of a general purpose computing device, such as a PC, and the like, or it may be formed as part of a more specialized device, such as a games console, mobile phone, portable computer device or hardware video encoder.

Another exemplary hardware embodiment of the present invention is that of a customer premises equipment 100 or a MPTCP proxy 190 as shown in FIG. 1 comprising an Application Specific Integrated Circuit (ASIC).

Further, while examples have been given in the context of particular communications standards, these examples are not intended to be the limit of the communications standards to which the disclosed method and apparatus may be applied. For example, while specific examples have been given in the context of particular communications networks, the principles disclosed herein can also be applied to any combination of communication systems which may be used in parallel.

The invention claimed is:

1. A first network node arranged to communicate with a second network node, the first and second network nodes being connected by a first path and a second path, the first path using a first communications network and the second path using a second communications network, and whereby the first network node has a first mode and a second mode of operation, such that in a first mode traffic between the first and second network nodes is transmitted over the first path and not the second path, and in a second mode traffic between the first and second network nodes is transmitted over the first path and the second path, wherein the network node comprises a mode selector arranged to select the second mode of operation when a demanded amount of traffic between the first and second network nodes exceeds a threshold value for a period of time, wherein the demanded amount of traffic is determined based on a rate of input traffic received by the first network node for transmission to the second network node, and the threshold value for the demanded amount of traffic is determined to be a percentage of a total bandwidth available on the first path, and the total bandwidth available on the first path is periodically measured and the threshold value recalculated after a measurement is taken, wherein the period of time is set based on balancing congestion between the first communication network and the second communication network.

2. The first network node of claim 1, further comprising a third mode of operation in which traffic between the first and second network nodes is sent only using the second path, and in which the mode selector is arranged to select this third mode should there be a fault on the first path.

3. The first network node of claim 1, wherein the first path comprises one of: a digital subscriber line, an optical fiber connection, a hybrid optical fiber copper wire connection, and a wireless connection; and wherein the second path comprises one of: a digital subscriber line, an optical fiber connection, a hybrid optical fiber copper wire connection, and a wireless connection.

4. A method in a first network node, the first network node arranged to communicate with a second network node, the first and second network nodes being connected by a first path and a second path, the first path using a first communications network and the second path using a second communications network, and whereby the first network node has a first mode of operation and a second mode of operation, such that in a first mode traffic between the first and second network nodes is transmitted over the first path and not the second path, and in a second mode traffic between the first and second network nodes is transmitted over the first path and the second path, wherein the method comprises:
  starting a timer when a demanded amount of traffic between the first and second network nodes exceeds a threshold value; and
  selecting the second mode of operation if the demanded amount of traffic exceeds the threshold value for the duration of the timer, wherein the duration of the timer is set based on balancing congestion between the first communication network and the second communication network, wherein the demanded amount of traffic is determined based on a rate of input traffic received by the first network node for transmission to the second network node, and the threshold value for the demanded amount of traffic is determined to be a percentage of a total bandwidth available on the first path, and the total bandwidth available on the first path is periodically measured and the threshold value recalculated after a measurement is taken.

5. The method of claim 4, wherein the first network node further comprises a third mode of operation in which traffic between the first and second network nodes is sent only using the second path, and wherein the first network node is arranged to detect a fault state on the first path, and in response to such a detection to select the third mode.

6. The method of claim 4, wherein the first path comprises one of: a digital subscriber line, an optical fiber connection, a hybrid optical fiber copper wire connection, and a wireless connection; and wherein the second path comprises one of: a digital subscriber line, an optical fiber connection, a hybrid optical fiber copper wire connection, and a wireless connection.

7. A non-transitory computer-readable medium, carrying instructions, which, when executed by computer logic, causes said computer logic to carry out the method defined by claim 4.

8. An apparatus to provide improved resource usage in a multipath network, the multipath network comprising a first network node arranged to communicate with a second network node, the first and second network nodes being connected by a first path and a second path, the first path using a first communications network and the second path using a second communications network, and whereby the first network node has a first mode of operation and a second mode of operation, such that in a first mode traffic between the first and second network nodes is transmitted over the first path and not the second path, and in a second mode traffic between the first and second network nodes is transmitted over the first path and the second path, the apparatus comprising:

a processor; and memory, said memory containing instructions executable by said processor whereby said apparatus is operative to:

start a timer when a demanded amount of traffic between the first and second network nodes exceeds a threshold value; and select the second mode of operation if the demanded amount of traffic exceeds the threshold value for the duration of the timer, wherein the duration of the timer is set based on balancing congestion between the first communication network and the second communication network, wherein the demanded amount of traffic is determined based on a rate of input traffic received by the first network node for transmission to the second network node, and the threshold value for the demanded amount of traffic is determined to be a percentage of a total bandwidth available on the first path, and the total bandwidth available on the first path is periodically measured and the threshold value recalculated after a measurement is taken.

9. The apparatus of claim 8, wherein the first network node further comprises a third mode of operation in which traffic between the first and second network nodes is sent only using the second path, and wherein the first network node is arranged to detect a fault state on the first path, and in response to such a detection to select the third mode.

10. The apparatus of claim 8, wherein the first path comprises one of: a digital subscriber line, an optical fiber connection, a hybrid optical fiber copper wire connection, and a wireless connection; and wherein the second path comprises one of: a digital subscriber line, an optical fiber connection, a hybrid optical fiber copper wire connection, and a wireless connection.

11. The first network node of claim 1, wherein the first network node continues to select the second mode of operation responsive to determining that the period of time has expired, that the demanded amount of traffic between the first and second network continues to exceed the threshold value, and that a fault has not occurred on the first path.

12. The first network node of claim 1, wherein the demanded amount of traffic comprises a demanded amount of uplink traffic and a demanded amount of downlink traffic, and wherein the threshold value comprises a first threshold value for the demanded amount of uplink traffic that is determined to be a percentage of the uplink bandwidth available on the first path and a second threshold value for the demanded amount of downlink traffic that is determined to be a percentage of the downlink bandwidth available on the first path.

13. The first network node of claim 12, wherein the first threshold value is different from the second threshold value.

14. The first network node of claim 1, wherein the first path and the second path utilize a same technology, and wherein a first cost associated with the operation of the first path is different from a second cost associated with the second path.

15. The first network node of claim 1, wherein the total bandwidth available on the first path fluctuates with time.

* * * * *

UNITED STATES PATENT AND TRADEMARK OFFICE
CERTIFICATE OF CORRECTION

PATENT NO. : 11,509,570 B2
APPLICATION NO. : 16/301006
DATED : November 22, 2022
INVENTOR(S) : Skog et al.

It is certified that error appears in the above-identified patent and that said Letters Patent is hereby corrected as shown below:

In the Specification

In Column 1, Line 44, delete "FTP/FTTH/FTTB" and insert -- FTTP/FTTH/FTTB --, therefor.

In Column 3, Line 34, delete "FTP/FTTH/FTTB" and insert -- FTTP/FTTH/FTTB --, therefor.

In Column 9, Line 60, delete "FTP/FTTH/FTTB" and insert -- FTTP/FTTH/FTTB --, therefor.

In Column 12, Line 4, delete "FTP/FTTH/FTTB" and insert -- FTTP/FTTH/FTTB --, therefor.

Signed and Sealed this
Twenty-sixth Day of September, 2023

Katherine Kelly Vidal
*Director of the United States Patent and Trademark Office*